US012731297B2

(12) United States Patent
Varekamp

(10) Patent No.: US 12,731,297 B2
(45) Date of Patent: Sep. 8, 2026

(54) COMPRESSION OF DEPTH MAPS

(71) Applicant: KONINKLIJKE PHILIPS N.V., Eindhoven (NL)

(72) Inventor: Christiaan Varekamp, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 137 days.

(21) Appl. No.: 18/848,983

(22) PCT Filed: Mar. 20, 2023

(86) PCT No.: PCT/EP2023/056988

§ 371 (c)(1),
(2) Date: Sep. 20, 2024

(87) PCT Pub. No.: WO2023/186588

PCT Pub. Date: Oct. 5, 2023

(65) Prior Publication Data

US 2025/0209675 A1 Jun. 26, 2025

(30) Foreign Application Priority Data

Mar. 30, 2022 (EP) ..................................... 22165489

(51) Int. Cl.
*G06T 9/00* (2006.01)
*G06T 17/20* (2006.01)

(52) U.S. Cl.
CPC .............. *G06T 9/001* (2013.01); *G06T 17/20* (2013.01)

(58) Field of Classification Search
CPC ................................ G06T 9/001; G06T 17/20
See application file for complete search history.

(56) References Cited

U.S. PATENT DOCUMENTS

2009/0195545 A1 8/2009 Debevec et al.
2018/0025530 A1 1/2018 Anthony et al.
(Continued)

FOREIGN PATENT DOCUMENTS

CN 104915921 A 9/2015
JP 2013089123 A 5/2013

OTHER PUBLICATIONS

Chai, Bing-Bing, et al. “Depth map compression for real-time view-based rendering.” Pattern recognition letters 25.7 (2004): 755-766. (Year: 2004).*

(Continued)

*Primary Examiner* — Daniel F Hajnik
*Assistant Examiner* — Sarah Yeo Lee

(57) ABSTRACT

An apparatus comprises a receiver (201) receiving a first depth map for a first video frame of a plurality of videos frames. A divider (203) divides the first depth map into two dimensional geometric primitives/polygons larger than two pixels. A map generator (207) generates a vertex position map indicative of the vertex positions of the geometric primitives in the first depth map. A depth map generator (205) generates a second depth map comprising the depth values of the first depth map at the vertex positions and a bitstream generator (209) generates the video bitstream to include, for the first video frame, the second depth map, and the vertex position map. The division is dependent on the depth values of the depth map. A complementary apparatus renders images using a mesh generated from the bitstream by determining the original vertex positions based on the received vertex position map and projecting these to a 3D space.

26 Claims, 8 Drawing Sheets

(56) References Cited

U.S. PATENT DOCUMENTS

2018/0035095 A1* 2/2018 Newton ........... H04N 21/21805
2021/0350621 A1 11/2021 Bailey et al.

OTHER PUBLICATIONS

Farin, Dirk, Rick Peerlings, and Peter HN de With. "Depth-image representation employing meshes for intermediate-view rendering and coding." 2007 3DTV Conference. IEEE, 2007. (Year: 2007).*
Merkle, Philipp, et al. "Depth intra coding for 3D video based on geometric primitives." IEEE Transactions on Circuits and Systems for Video Technology 26.3 (2015): 570-582. (Year: 2015).*
International Search Report and Written Opinion from PCT/EP2023/056988 mailed Jun. 21, 2023.
Merkle Philipp et al: "Depth Intra Coding for 3D Video Based on Geometric Primitives", IEEE Transactions on Circuits and Systems for Video Technology, IEEE, USA, vol. 26, No. 3, Mar. 1, 2016 (Mar. 1, 2016), pp. 570-582.
Dirk Farin et al: "Depth-Image Representation Employing Meshes for Intermediate-View Rendering and Coding", 3DTV Conference, 2007, IEEE, PI, May 1, 2007 (May 1, 2007), pp. 1-4.
Sung-Yeol Kim et al "Coding for 3D Video using Hierarchical Decomposition of Depth Maps", Image Processing, 2007. ICIP 2007. IEEE International Conference on, IEEE, PI, Sep. 1, 2007 (Sep. 1, 2007), pp. V-117.
Chai Et Al. Depth Map Compression for real-time view-based rendering, Pattern Recognition Letters, Elsevier, Amsterdam, NL, vol. 25, No. 7, May 1, 2004 (May 1, 2004), pp. 755-766.

* cited by examiner (a)

| A | B | C | D |
|---|---|---|---|
| E | F | G | H |
| I | J | K | L |

(b)

| 0 | 2 | -1 | 0 |
|---|---|---|---|
| 0 | 2 | -1 | 0 |
| 3 | 0 | 0 | 0 |

(c)

(a)

| 0 | 2 | -1 | 0 |
|---|---|---|---|
| 0 | 2 | -1 | 0 |
| 3 | 0 | 0 | 0 |

(b)

| 0 | 0 | 0 | 0 |
|---|---|---|---|
| 0 | -1 | 0 | 0 |
| 0 | 0 | 0 | 0 |

(c)

COMPRESSION OF DEPTH MAPS

CROSS-REFERENCE TO PRIOR APPLICATIONS

This application is the U.S. National Phase application under 35 U.S.C. § 371 of International Application No. PCT/EP2023/056988, filed on Mar. 20, 2023, which claims the benefit of EP Patent Application No. EP 22165489.0, filed on Mar. 30, 2022. These applications are hereby incorporated by reference herein.

FIELD OF THE INVENTION

The invention relates to a video signal and a processing thereof, and in particular, but not exclusively, to generating and rendering of images from a bitstream based on a three dimensional mesh.

BACKGROUND OF THE INVENTION

The variety and range of image and video applications have increased substantially in recent years with new services and ways of utilizing and consuming video being continuously developed and introduced.

For example, one service being increasingly popular is the provision of image sequences in such a way that the viewer is able to actively and dynamically interact with the system to change parameters of the rendering. A very appealing feature in many applications is the ability to change the effective viewing position and viewing direction of the viewer, such as for example allowing the viewer to move and look around in the scene being presented.

Such a feature can specifically allow a virtual reality experience to be provided to a user. This may allow the user to e.g. (relatively) freely move about in a virtual environment and dynamically change his position and where he is looking. Typically, such extended Reality (XR) applications are based on a three-dimensional model of the scene with the model being dynamically evaluated to provide the specific requested view. This approach is well known from e.g. game applications, such as in the category of first person shooters, for computers and consoles. extended Reality (XR) applications include Virtual Reality (VR), Augmented Reality (AR), and Mixed Reality (MR) applications.

An example of a video service or application that has been proposed is immersive video where video is played-back on e.g. a VR headset to provide a three-dimensional experience. For immersive video, the viewer has freedom to look and move around in the presented scene such that this may be perceived as being viewed from different viewpoints. However, in many typical approaches, the amount of movement is limited, e.g. to a relatively small area around a nominal viewpoint which may typically correspond to a viewpoint from which the video capture of the scene has been performed. In such applications, three dimensional scene information is often provided that allows high quality view image synthesis for viewpoints that are relatively close to the reference viewpoint(s) but which deteriorates if the viewpoint deviates too much from the reference viewpoints.

Immersive video may also often be referred to as 6-degrees-of-freedom (6DoF) or 3DoF+ video. MPEG Immersive Video (MIV) is an emerging standard where meta-data is used on top of existing video codecs to enable and standardize immersive video.

An issue with immersive video is that the viewing-space, being 3d-space wherein a viewer has a 6DoF experience of sufficient quality, is limited. As the viewer moves outside the viewing space, degradations and errors resulting from synthesizing the view images become increasingly significant and an unacceptable user experience may result. Errors, artefacts, and inaccuracies in the generated view images may specifically occur due to the provided 3D video data not providing sufficient information for the view synthesis (e.g. de-occlusion data).

For example, immersive video data may be provided in the form of a multi-view possibly accompanied with depth data (MVD) representation of the scene. The scene may be captured by a number of spatially differentiated cameras and the captured images may be provided together with depth maps.

View synthesis for applications such as immersive video is often based on depth maps providing depth information for source view(s). The depth maps may be accompanied by texture maps that may directly correspond to the captured images from those views or which may describe textures to map on the three dimensional objects and features in the scene.

Many view synthesis algorithms are based on constructing a mesh model from a depth map that e.g. may be packed in the pixel data of a video stream. During rendering, a number of source view textures are then, based on the mesh model, warped to the target viewpoint and blended and/or composited to produce an image for that target viewpoint.

Such operations require a lot of processing and includes for example warping many vertices of the mesh model to the appropriate 2D positions for the specific target viewpoint. The process is suitable for parallel processing and efficient implementations using massive parallel processing structures are widespread. For example, efficient graphics pipelines are developed and implemented in graphic cards for standard or gaming personal computers.

In conventional graphics processing, such as for games and many fully virtual reality experiences, the rendering may be based on relatively static mesh representations of a scene which is only updated at relatively slow rate to reflect the dynamic changes in the scene. However, in contrast, for immersive video applications, new depth maps are often provided for each new frame with these requiring to be converted (in some cases implicitly) to mesh representations as part of the rendering.

For immersive video, a very high computational resource is therefore often required for rendering of the received video. Furthermore, the data rate of the video signal comprising three dimensional information for the rendering tends to be undesirably high. Approaches trying to mitigate these issues tend to result in reduced performance, user experience, and/or image quality. Thus, traditional approaches for three dimensional/immersive video tend to be suboptimal.

Hence, an improved approach would be advantageous. In particular, an approach that allows improved operation, increased flexibility, an improved immersive user experience, reduced complexity, facilitated implementation, increased synthesized image quality, improved rendering, improved and/or facilitated view synthesis for different view poses, improved computational efficiency, improved quality, reduced data rates, more accurate representation of a scene and/or improved performance and/or operation would be advantageous.

SUMMARY OF THE INVENTION

Accordingly, the Invention seeks to preferably mitigate, alleviate or eliminate one or more of the above-mentioned disadvantages singly or in any combination.

According to an aspect of the invention there is provided an apparatus for generating a video signal comprising a bitstream, the apparatus comprising: a receiver arranged to receive a first depth map for at least a first video frame of a plurality of videos frames; a divider arranged to divide at least part of the first depth map into two dimensional geometric primitives, the two dimensional geometric primitives having an average area exceeding twice a pixel area for the first depth map and the division including determining vertex positions in the first depth map for vertices of the geometric primitives; a map generator arranged to generate a vertex position map indicative of the vertex positions in the first depth map; a depth map generator arranged to generate a second depth map comprising the depth values of the first depth map at the vertex positions in the first depth map; a bitstream generator arranged to generate the video bitstream to include, for the first video frame, the second depth map, and the vertex position map; and wherein the divider is arranged to generate the vertex positions dependent on the depth values of the first depth map.

The invention may allow improved data characterizing a scene being generated. The approach may allow improved image synthesis for different view poses based on the generated bitstream. In many embodiments, data allowing efficient and high quality view shifting and synthesis may be generated.

The invention may provide an improved user experience in many embodiments and scenarios. The approach may for example allow improved immersive video or XR/AR/VR/MR applications. The approach may in many embodiments support an improved user experience with the potential of rendering improved quality view images from the video signal and bitstream.

The approach may in many embodiments reduce the data rate of the bitstream. The approach may allow improved spatial information for a given data rate. The approach may in many embodiments provide improved support for rendering and may allow a reduced complexity and/or higher computational efficiency for the generating and/or the rendering end. The approach may for example provide improved suitability for processing by highly efficient and optimized functionality, such as graphic pipelines using a high degree of parallelization.

In some embodiments, the receiver may further receive a texture map linked to the depth map and the bitstream generator may be arranged to include the texture map in the bitstream.

The division may in many embodiments be a tessellation. The two dimensional geometric primitives may in many embodiments be polygons, and often 3, 4, or 6 sided polygons. Vertex positions may be positions, and often pixel positions, in the first depth map of vertices/corners of the geometric primitives/polygons.

The two dimensional geometric primitives may in many embodiments have an average area not less than 3, 4, 8 or 16 times a pixel area for the first depth map. The second depth map comprises fewer depth values/pixels than the first depth map, and often by a factor of no less than 2, 3, 4, 8, 16 times.

The divider may be arranged to generate the vertex positions to reduce depth variations within the geometric primitives, for example a reduced average depth variation within geometric primitives may be reduced.

According to an optional feature of the invention, the divider is arranged to determine the vertex positions by offsetting reference vertex positions of a reference division of the depth map; the offsetting for a first vertex point being dependent on values of the first depth map for pixels within a geometric primitive of the first vertex point.

This may provide improved and/or facilitated operation and/or performance in many embodiments. It may facilitate determination of the vertex positions/2D primitives and may often allow a more efficient representation.

The reference division may correspond to/be equivalent to a reference set of vertex positions/a reference pattern of reference vertex positions/a reference pattern of geometric primitives.

The offsetting of the reference vertex positions may be such that an average area of the geometric primitives is unchanged.

The number of vertex points represented by the vertex position map may be no more than the number of reference vertex positions. The number of vertex points represented by the vertex position map may be identical to the number of reference vertex positions.

According to an optional feature of the invention, the reference vertex positions of the reference division form a regular grid.

This may provide improved and/or facilitated operation and/or performance in many embodiments. In many embodiments, a reference grid may provide an improved or optimal starting point for adapting to a specific depth.

In many embodiments, new vertex positions may be determined by a relative shift of vertex positions relative to reference vertex positions of a relative vertex position pattern. According to an optional feature of the invention, the vertex position map indicates the vertex positions as relative positions with respect to the reference vertex positions of the reference division.

This may provide advantageous operation in many embodiments. It may often allow a substantially reduced data rate and may allow a vertex position map to be generated that is highly suitable for encoding and compression including using existing video encoding techniques.

According to an optional feature of the invention, the offsetting includes a first offset along a first predetermined direction and the first offset is determined as an offset for which a change of depth map values along the first predetermined direction meets a criterion.

This may provide a particularly advantageous operation in many embodiments. It may allow a lower complexity and/or improved computational efficiency in many embodiments. The approach may provide an efficient and high performance adaptation to many different depth maps. The divisor may in some embodiments determine a step change for different offsets and determine the offset depending on depth variations for the different offsets.

The first predetermined direction may be a horizontal and/or vertical direction.

According to an optional feature of the invention, the offsetting includes a second offset along a second predetermined direction and the second offset is determined as an offset for which a change of depth map values along the second predetermined direction meets a criterion; the map generator is arranged to generate the vertex position map to indicate offsets along the first predetermined direction and to further generate and additional vertex position map to indicate offsets along the second predetermined direction; and the bitstream generator is arranged to include the additional vertex position map in the bitstream.

This may provide a particularly advantageous operation in many embodiments. It may allow a lower complexity and/or improved computational efficiency in many embodiments. The approach may provide an efficient and high performance adaptation to many different depth maps. The divisor may in some embodiments determine a step change for different offsets and determine the offset depending on depth variations for the different offsets.

The first and second predetermined directions may be a horizontal and vertical direction.

According to an optional feature of the invention, the first predetermined direction is a horizontal direction.

According to an optional feature of the invention, the offsetting is constrained to be below vertical direction.

According to an optional feature of the invention, the first predetermined direction is a an offset threshold.

According to an optional feature of the invention, the bitstream generator comprises a video encoder arranged to encode the vertex position map using video encoding.

This may provide a more efficient encoding in many embodiments and/or may allow reuse of existing functionality also used for other purposes.

According to an optional feature of the invention, the divider is arranged to determine the vertex positions to align the geometric primitives with depth transitions in the depth map.

This may provide particularly advantageous operation in many embodiments and scenarios. It may in particular reduce artefacts and inaccuracites that may result from depth transitions.

According to another aspect of the invention, there is provided apparatus for rendering a bitstream of a video signal, the apparatus comprising: a receiver for receiving a video bitstream, the video bitstream comprising, for at least a first frame, a first depth map, and a vertex position map indicative of vertex positions for depth values of the first depth map in a second map having a higher resolution than the first depth map, the vertex positions defining two dimensional geometric primitives forming a division of the second map; a renderer arranged to render video images from the video bitstream, the renderer comprising: a mesh generator arranged to generate a mesh representation of a scene, the mesh being formed by three dimensional geometric primitives formed by projection of the two dimensional geometric primitives to a three dimensional space, the projection for a first vertex of a two dimensional geometric primitive depending on a vertex position of the first vertex in the second depth map and a depth value in the first depth map for the first vertex; and a rendering unit arranged to render an image based on the mesh representation.

The invention may allow improved images to be generated in many embodiments and scenarios. The approach may allow improved image synthesis for different view poses.

The invention may provide an improved user experience in many embodiments and scenarios. The approach may for example allow improved immersive video or XR/AR/VR/MR applications. The approach may in many embodiments support an improved user experience with the potential of rendering improved quality view images from the video signal and bitstream.

The approach may in many embodiments reduce the data rate of the bitstream. The approach may often reduce rendering artefacts and inaccuracies, in particular in connection with depth steps/transitions. The approach may in many embodiments allow a reduced complexity and/or higher computational efficiency. The approach may for example provide improved suitability for processing by highly efficient and optimized functionality such as graphic pipelines using a high degree of parallelization.

In some embodiments, the bitstream may further include a texture map linked to the depth map and the rendering unit may be arranged to render the image based on the texture map.

The rendering unit may be arranged to render the image to correspond to a view image from a view pose. The rendering may include evaluating the mesh representation for the view pose.

According to an optional feature of the invention, the vertex position map is indicative of the vertex positions as relative vertex positions with respect to reference vertex positions of a reference division; and the mesh generator is arranged to determine absolute vertex positions in the second depth map in response to the relative vertex positions and the reference vertex positions.

This may provide improved and/or facilitated operation and/or performance in many embodiments.

According to an optional feature of the invention, the bitstream comprises an indication of the reference division; and the mesh generator is arranged to determine the reference vertex positions in response to the indication of the reference division.

This may provide improved and/or facilitated operation and/or performance in many embodiments.

According to another aspect of the invention, there is provided a method of generating a video signal comprising a bitstream, the method comprising: receiving a first depth map for at least a first video frame of a plurality of videos frames; dividing at least part of the first depth map into two dimensional geometric primitives, the two dimensional geometric primitives having an average area exceeding twice a pixel area for the first depth map and the division including determining vertex positions in the first depth map for vertices of the geometric primitives; generating a vertex position map indicative of the vertex positions in the first depth map; generating a second depth map comprising the depth values of the first depth map at the vertex positions in the first depth map; generating the video bitstream to include, for the first video frame, the second depth map, and the vertex position map; and wherein generating the vertex positions is in dependence on the depth values of the depth map.

According to another aspect of the invention, there is provided a method of rendering a bitstream of a video signal, the method comprising: receiving a video bitstream, the video bitstream comprising, for at least a first frame, a first depth map, and a vertex position map indicative of vertex positions for depth values of the first depth map in a second map having a higher resolution than the first depth map, the vertex positions defining two dimensional geometric primitives forming a division of the second map; rendering video images from the video bitstream, the rendering comprising: generating a mesh representation of a scene, the mesh being formed by three dimensional geometric primitives formed by projection of the two dimensional geometric primitives to a three dimensional space, the projection for a first vertex of a two dimensional geometric primitive depending on a vertex position of the first vertex in the second depth map and a depth value in the first depth map for the first vertex; and rendering an image based on the mesh representation.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

The following description will focus on an immersive video application, but it will be appreciated that in other embodiments, the described concepts, implementations, approaches, and principles may be applied to other video applications.

Three dimensional video capture, distribution, and presentation is becoming increasingly popular and desirable in some applications and services. A particular approach is known as immersive video and typically includes the provision of views of a real-world scene, and often a real time event, that allow small viewer movements, such as relatively small head movements and rotations. For example, real-time video broadcast of e.g., a sports event that allows local client-based generation of views following small head movements of a viewer may provide the impression of a user being seated in the stands watching the sports event. The user can e.g., look around and will have a natural experience similar to the experience of a spectator being present at that position in the stand. Recently, there has been an increasing prevalence of display devices with positional tracking and 3D interaction supporting applications based on 3D capturing of real-world scenes. Such display devices are highly suitable for immersive video applications providing an enhanced three dimensional user experience.

The following description will focus on an immersive video application, but it will be appreciated that the described principles and concepts may be used in many other applications and embodiments.

In many approaches, the immersive video may be provided locally to a viewer by e.g. a stand-alone device that does not use, or even have any access to, any remote video server. However, in other applications, an immersive application may be based on data received from a remote or central server. For example, video data may be provided to a video rendering device from a remote central server and may be locally processed to generate a desired immersive video experience.

Figure 1:
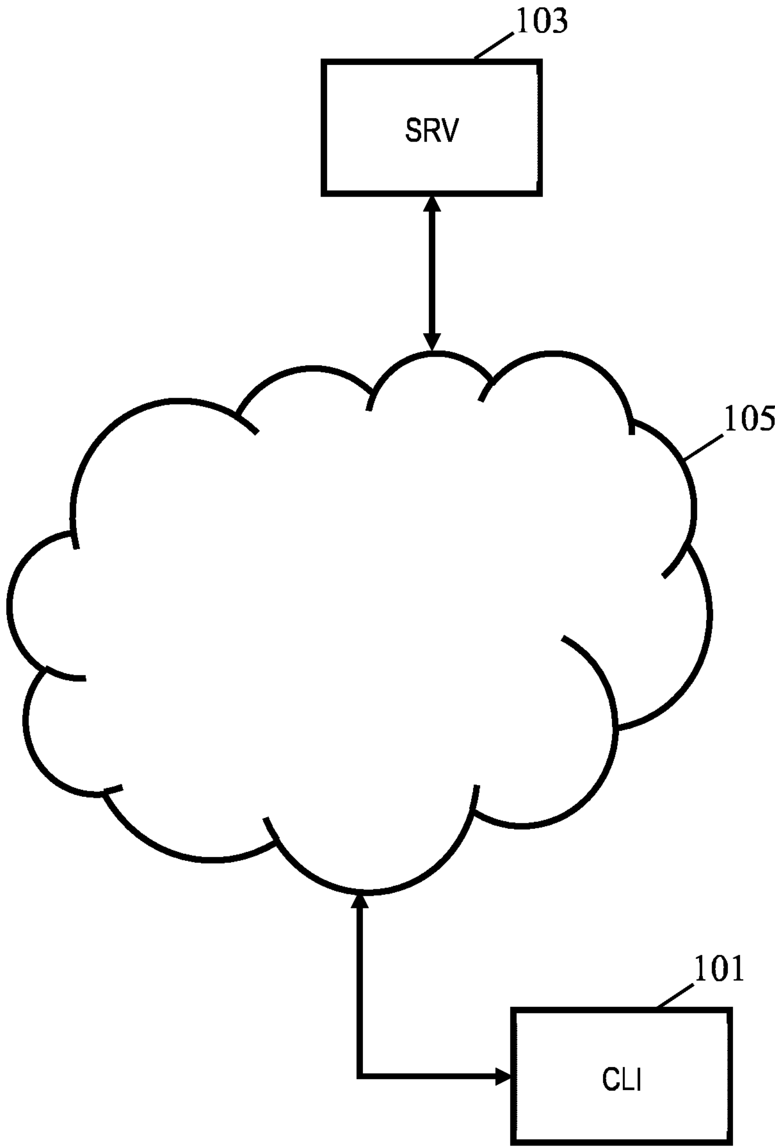
FIG. 1 illustrates an example of elements of a server client system.

FIG. 1 illustrates such an example of an immersive video system in which a video rendering client 101 liaises with a remote immersive video server 103 e.g. via a network 105, such as the Internet. The server 103 may be arranged to simultaneously support a potentially large number of client devices 101.

The server 103 may for example support an immersive video experience by transmitting a video signal comprising three dimensional video data describing a real world scene. The data may specifically describe visual features and geometric properties of the scene which is generated from a real time capture of the real world by a set of (possibly 3D) cameras.

In order to provide such services for a real-world scene, the scene is typically captured from different positions and with different camera capture poses being used. As a result, the relevance and importance of multi-camera capturing and e.g. 6DoF (6 Degrees of Freedom) processing is quickly increasing. Applications include live concerts, live sports, and telepresence. The freedom of selecting one's own viewpoint enriches these applications by increasing the feeling of presence over regular video. Furthermore, immersive scenarios can be conceived where an observer may navigate and interact with a live captured scene. For broadcast applications this may require real-time view synthesis at the client device. View synthesis introduce errors and these errors depend on the implementation details of algorithms.

A popular approach for providing the relevant information to the rendering side is to provide a video signal which for each video frame may provide a depth map and texture map. A renderer may in such embodiments generate a mesh representation based on the depth map and then generate a view image by projecting the mesh to the appropriate positions in a view image/port for the given view pose. The renderer may warp a texture map that is associated with the mesh to synthesize visible image for the given view pose.

The server 103 of FIG. 1 is arranged to generate a video signal comprising data describing the scene by a sequence of frames with depth maps and texture data being provided for at least some frames. The client 101 is arranged to receive and process this video signal to provide views for a given view pose. The client 101 may generate an output video stream or display drive signal that dynamically reflects changes in the view pose thereby providing an immersive video experience where the presented view adapts to viewing/user pose/placement changes.

In the field, the terms placement and pose are used as a common term for position and/or direction/orientation. The combination of the position and direction/orientation of e.g., an object, a camera, a head, or a view may be referred to as a pose or placement. Thus, a placement or pose indication may comprise six values/components/degrees of freedom with each value/component typically describing an individual property of the position/location or the orientation/direction of the corresponding object. Of course, in many situations, a placement or pose may be considered or represented with fewer components, for example if one or more components is considered fixed or irrelevant (e.g. if all objects are considered to be at the same height and have a horizontal orientation, four components may provide a full representation of the pose of an object). In the following, the term pose is used to refer to a position and/or orientation which may be represented by one to six values (corresponding to the maximum possible degrees of freedom). The term pose may be replaced by the term placement. The term pose may be replaced by the term position and/or orientation. The term pose may be replaced by the term position and orientation (if the pose provides information of both position and orientation), by the term position (if the pose provides information of (possibly only) position, or by orientation (if the pose provides information of (possibly only) orientation.

Typically, rendering of video images for a given view pose based on depth maps and texture maps includes the steps of decoding a still image or video frame to GPU memory and in a vertex shader retrieving/sampling image space vertex data form the still image or video frame, constructing an image space homogeneous coordinate vector for each vertex and transforming/warping each vertex to the image space of the target view. The vertices relate to a pre-defined mesh topology that is typically created at an initialization stage. The mesh topology (e.g. triangles/quads or other) determines how a fragment shader that follows the vertex shader stage needs to warp an associated texture to the target view. Since the image or video frame is already in GPU memory, this fragment shader directly samples from it to generate the resulting view.

Conventionally, the depth map is required to be of high resolution in order to get a fine mesh which accurately represents the geometric properties. Typically, the depth map has at least the same resolution as the texture map. This provides for accurate representations of the spatial properties of the scene by a detailed high resolution mesh model. However, this approach requires high computational resource, and in practice such high accuracy typically does not allow real time rendering due to the large number of mesh triangles (e.g. two triangles per pixel).

In order to address this, a coarser mesh model with larger triangles may be used and these larger triangles may be generated by sub-sampling the high-resolution depth map or by just packing a lower resolution depth map in the video frame anticipating the use of a lower resolution mesh. combining triangles of the finer mesh generated from the depth map. However, such conventional approaches may result in the render quality reducing e.g. near depth transitions.

In the following, an approach will be described which may in many scenarios provide improved operation and/or performance. In many cases, an improved rendering quality can be achieved.

Figure 2:
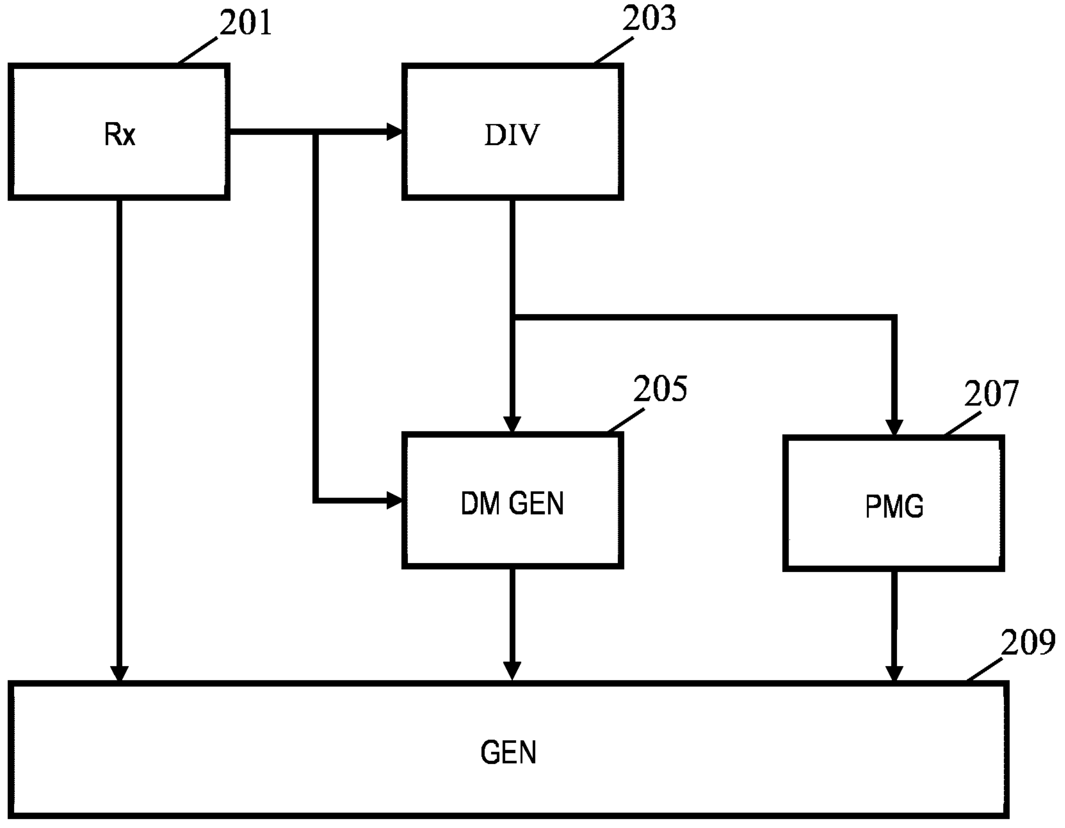
FIG. 2 illustrates an example of elements of an apparatus in accordance with some embodiments of the invention.
Figure 3:
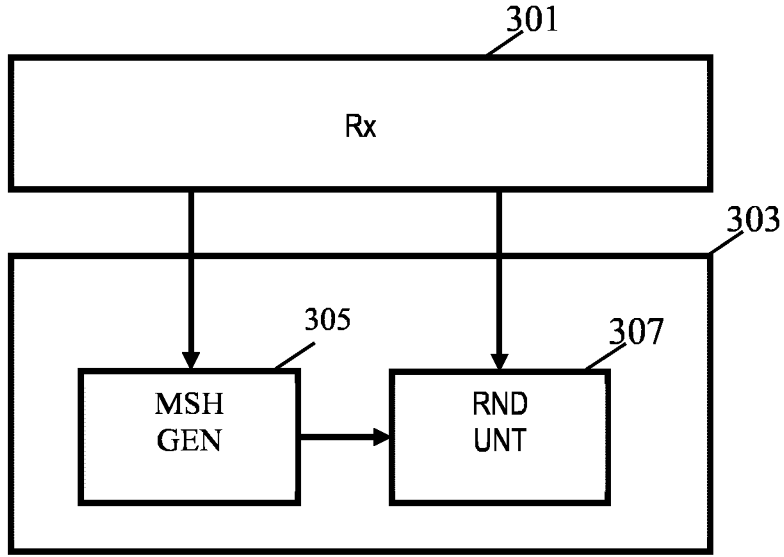
FIG. 3 illustrates an example of elements of an apparatus in accordance with some embodiments of the invention.

FIG. 2 illustrates elements of an exemplary apparatus for generating a video signal comprising bitstream representing a scene. The apparatus of FIG. 2 may specifically correspond to the server 103 of FIG. 1 and will be described in this context. FIG. 3 illustrates elements of an exemplary apparatus for rendering a video bitstream of a video signal, and specifically from a video bitstream generated by the apparatus of FIG. 2. The apparatus may specifically be an end user device or client receiving the audio visual data stream from a remote device, such as from the apparatus of FIG. 2. Specifically, the apparatus of FIG. 3 may be an example of elements of the client 101 of FIG. 1 and the following description will focus on this context.

The apparatus of FIG. 2, and thus in the specific example the server 102, comprises a receiver 201 which receives data that includes depth maps and linked texture maps for one or more video frames. In some embodiments, multiple depth maps may be linked with the same texture map and for example texture maps may not be provided for all frames and/or depth maps may not be provided for all frames.

The server may specifically receive an input video signal with time sequential video frames represented by depth maps and texture maps. Such an input video signal may for example be received from a processing unit generating the depth maps and texture maps from a live capture, such as for example from a plurality of images of a scene captured from different view poses. In other embodiments, the input data may for example be received from an external or internal source that is arranged to generate the depth maps and texture maps from a model of a scene. It will be appreciated that the generation and use of depth maps and linked texture maps are known to a person skilled in the field of 3D video and therefore the description will for clarity and conciseness not describe this in further detail.

The depth maps may be provided at a relatively high resolution, and specifically in many embodiments, the depth maps and texture maps may be provided with the same resolution. The apparatus of FIG. 2, which will henceforth be referred to as the encoding apparatus, is arranged to generate an output video signal where one, more, and often all video frames are represented by a depth map and a texture map. Further, one, more, or all of the output depth maps are generated to have a lower resolution than the corresponding depth map. The encoding apparatus uses a specific approach for reducing the resolution of the depth maps such that an improved representation allowing improved rendering may be achieved in many scenarios.

The depth map is fed from the receiver 201 to a divider 203 which is arranged to divide at least part of the depth map into two dimensional geometric primitives. The two dimensional geometric primitives are typically polygons, such as specifically triangles or squares. In most embodiments, but not necessarily all, the division is into identical geometric primitives. However, in some embodiments, the division may be into different geometric primitives.

The division may in some embodiments be for a part of the depth map but typically it will be applied to the entire depth map. In some embodiments, the division may allow some gaps or holes to exist between the defined geometric primitives (for example the division may use polygons or sets of polygons that do not completely align and combine to cover the entire depth map area, but which may include small gaps/holes. These may often however be so small that they will not have any significant effect on the performance.

The division may correspond to mutually overlapping spatial 2D image space regions such that when rendered from for a given view pose, the resulting warped meshes overlap. Each separate spatial 2D image space region may have different primitive parameters. For example, the size of the mesh primitives can differ between regions.

In many embodiments, the division is a tessellation of at least part of the depth map, and typically of the entire depth map. The tessellation may for example be into triangles, squares or hexagons. The tessellation is typically a regular tessellation but may in many embodiments be an irregular tessellation.

The divider 203 is typically arranged to perform a division, and specifically a tessellation, into polygons all having the same number of sides, such as triangles or squares, but with the shape of each polygon varying. Indeed, in many embodiments, the divider 203 may be arranged to perform the division/tessellation by first performing a standard regular division/tessellation with this subsequently being deformed to provide the final division/tessellation.

The divider 203 may be arranged to perform the division/tessellation by determining vertex points in the depth map for the geometric primitives and specifically (new) vertex positions in the depth map may be determined to define the geometric primitives.

The geometric primitives will typically be polygons, and often triangles or squares. The vertex points are typically the corners of the polygons, such as the corners of the triangles or squares. The vertex points are shared between multiple polygons to provide the tessellation. For example, for a triangular geometric primitive, most vertex points may be shared between six or eight triangles, and for a quadrilateral geometric primitive, most vertex points may be shared between four quadrilaterals. Changing the position of a vertex point may thus modify a plurality of geometric primitives at the same time.

In many embodiments, the vertex positions are pixel positions for the depth map and thus each vertex position is determined as the position of a pixel in the depth map. The position resolution for the vertices may be equal to the pixel resolution of the depth map.

The divider 203 is arranged to determine the geometric primitives/polygons such that these on average are larger than the pixels, and indeed are larger than two pixel areas. Thus, the vertex positions are on average more than one pixel apart for at least one side of the polygon, and often at least twice a pixel distance for at least one side. Typically, the number of geometric primitives determined for the part of the depth map being divided/tessellated is less than the number of pixels in the part being divided, and typically be a factor no less than 2, 3, 5, or even 10 times. In many embodiments, the number of geometric primitives generated by the division is less than the number of pixels in the input depth map by a factor of no less than 2, 3, 5, or even 10 times. The number of distinct vertex points of the geometric primitives is in many embodiments less than the number of pixels in the (part of the) input depth map being divided/tessellated by a factor of no less than 2, 3, 5, or even 10 times.

The division thus provides a decimation/resolution decrease compared to a division into geometric primitives resulting from using the pixels as vertex points.

The divisor 203 is arranged to generate the vertex positions dependent on the depth values of the depth map. Thus, rather than generate a predetermined or fixed division into polygons/primitives, an adaptive and flexible approach is applied in which the division into polygons/primitives is made to reflect the depth variations of the depth map. In many embodiments, the divisor 203 is arranged to determine the vertex positions to align the polygons with depth transitions in the depth map. In some embodiments, the depth transition alignment may be done with sub-pixel accuracy. The divisor 203 may be arranged to determine a fixed number of polygons and vertex points but with the size and position of the polygons varying to align the polygons with depth transitions.

The divisor 203 is coupled to a depth map generator 205 which receives data from the divisor 203 describing the determined vertex positions in the input depth map. The depth map generator 205 is further coupled to the receiver 201 from which it receives the input depth map.

The depth map generator 205 is arranged to generate an output depth map which comprises the depth values of the input depth map at the determined vertex positions in the first depth map. Thus, the depth values at the selected vertex positions are included in the output depth map whereas depth values for other positions/pixels in the input depth map are not included. The output depth map thus includes a subset of the depth values of the input depth map and accordingly a spatial decimation/resolution reduction is achieved.

The depth map generator 205 is further coupled to a position map generator 207 which is also fed the indication of the determined new vertex positions. The position map generator 207 is arranged to generate a vertex position map which indicates the vertex positions in the input depth map. In many embodiments, the vertex position map may include a position indication for each vertex position. Thus, in many embodiments, the resolution of the output depth map and the vertex position map may be the same, and indeed each depth value of the output depth map may be linked with a position value in the vertex position map, and vice versa. In some embodiments, the vertex position map may have a vertex position that has a higher resolution than the original vertex positions (which generally tends to correspond to the discrete depth map pixel positions).

The apparatus of FIG. 2 further comprises a bitstream generator 209 which is arranged to generate a video bitstream for a video signal.

The bitstream generator 209 may specifically be arranged to generate the video stream to include, for a given frame, a texture map received from the receiver 201 (often directly the same as that received by the receiver 201), the output depth map received from the depth map generator 205, and the vertex position map received from the position map generator 207. In some embodiments, all the three types of data may be provided for all frames of the video signal. In other embodiments, one, more, or all of the three types of data may only be provided for some of the frames. In such examples, data for frames for which explicit data is not included may at the rendering side be generated from other frames for which the data is provided. E.g., values from other frames may in some embodiments be used directly or may be used for interpolation or extrapolation.

The bitstream generator 209 may be arranged to generate the bitstream to follow any suitable structure, arrangement, and/or standard. For example, the bitstream may be generated in accordance with a known video standard with e.g., the vertex position map being included in metadata sections. Further, the bitstream generator 209 may implement suitable encoding algorithms. Specifically, the texture maps and depth maps may be encoded using known video encoding algorithms. In many embodiments, the vertex position map may also be encoded using a video encoding scheme, including potentially a lossy video encoding scheme.

The following description will for clarity and conciseness focus on embodiments in which the divisor 203 is arranged to perform a tessellation of the entire input depth map into triangles, and thus with each geometric primitive/polygon having three vertex points. However, it will be appreciated that this is merely exemplary and that other polygons/primitives may be used, that only part of the depth map may be divided/tessellated, and/or that the division may in some cases leave gaps or holes.

In many embodiments, the determination of the vertex positions, and thus the division/tessellation, is based on a reference division of the depth map. The reference division is given by a reference pattern of vertex positions, and thus equivalently the determination of the vertex points is based on a reference pattern of vertex point positions in the input depth map.

In many embodiments, the reference division/position pattern may be a regular grid. For example, the reference vertex positions may be given as positions with a predetermined distance between nearest neighbors in respectively the horizontal and vertical direction. The distance may be given in terms of pixel positions.

Figure 4:
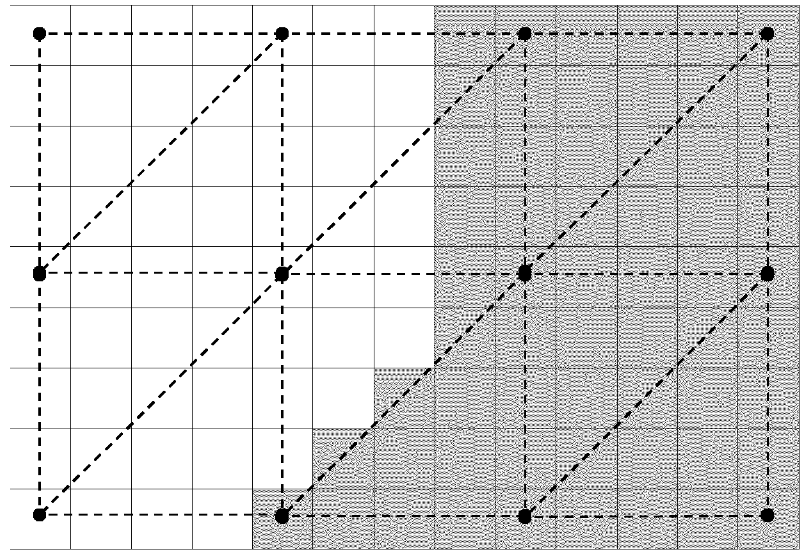
FIG. 4 illustrates an example of a depth map representation of a view of a scene.

An example of a reference division/pattern based on a regular grid is illustrated in FIG. 4. In the example, the grid is formed by vertex positions at every fourth input depth map pixel in both the horizontal and vertical directions. In the example, the reference geometric primitives are triangles and for each 4×4 area, two triangles are formed. In the example of FIG. 4, the reference division thus corresponds to a regular mesh with two triangles per 4×4 pixel block. In the example of FIG. 4, the depth map includes values reflecting a depth step/transition as occurring between the gray shaded pixels and the non-gray shaded pixels.

The reference division and mesh thus provide an under sampling of the input depth map thereby providing a spatial decimation of the depth map. Thus, the reference pattern may provide a substantial reduction in the number of vertex points required to represent the corresponding mesh compared to that required by using all depth values to form a depth map. Thus, a more data efficient representation of the underlying scene may be achieved. However, the coarse division and mesh also results in a less accurate representation of the spatial properties. In the apparatus of FIG. 2, the determined reference vertex positions may be offset relative to the reference vertex positions. The vertex position offsets are determined based on the depth values of the input depth map. This approach may in many scenarios mitigate the impact of the resolution reduction.

In many embodiments, the new vertex positions are determined by a relative shift of the vertex positions relative to the reference vertex positions in the reference pattern/division. The divisor 203 may be arranged to determine the offset for a given vertex point in dependence on the depth values of the input depth map for pixels within at least one of geometric primitives that includes the given vertex point. In many embodiments, the divisor 203 may consider the depth values in more than one of the primitives including the given vertex point, and indeed it may often consider at least one of the values of at least two primitives (partially) determined by the given vertex point. In some embodiments, the offset may also consider the depth values belonging to primitives that are not formed by the given vertex point being offset. For example, if the offset of the vertex point results in other vertex points being shifted, this may affect depth variations within another primitive and these variations may be considered.

As yet another example, in some embodiments, the positioning of vertices could further be based on texture variation inside a region. For example, regions may be determined which are reasonably flat (in accordance with any suitable criterion) and with each region having a similar texture but with different regions having different (degrees of) texture. Thus, regions could be determined which do not have a large depth transition, but which have different textures. The vertices may be arranged such that this results in separate vertices. The effect of this would become visible after view synthesis since typically more textured regions are more susceptible to depth artefacts.

It will be appreciated that the specific algorithms and criterion for determining the vertex positions for the output depth map, and specifically the offsets, will vary dependent on the requirements and preferences of the individual embodiment.

In many embodiments, the divisor 203 is arranged to determine the offset vertex positions to align the primitives with depth transitions in the depth map. For example, lines corresponding to a depth transition may be determined in the depth map, such as e.g. by determining a line for which depth gradients exceed a given threshold or a contour line for an area with a large depth gradient (it will be appreciated that many different techniques for determining depth transition lines in a depth map will be known to the skilled person). The vertex offsets may then be determined based on the determined lines of depth transitions. For example, a given vertex point may be offset to increase the size of a primitive under the criterion that the primitive may not be extended across a depth transition line, and subject to a maximum offset.

As another example, the offset may be determined as a function of a depth variation for depth values within the primitive. For example, a depth variation measure may be determined for a given primitive for different possible offsets. The offset resulting in the largest primitive for which the depth variation is below a given threshold may then be selected. As another example, the depth variation measure may be determined for all primitives affected by the offset. A cost measure may then be determined for each primitive as a monotonically increasing function of the size of the primitive and a monotonically increasing function of the depth variation (e.g. for a given offset, a cost measure may be determined for each primitive by multiplying the size of the primitive by the depth variation measure of the primitive). A cost measure may then be determined by combining the cost values for all primitives for a given offset, and the offset with the smallest cost value may be selected. Such an approach may in many scenarios result in an offset being selected where depth transitions and variations are focused in smaller primitives, whereas larger primitives will tend to be relatively flat.

It will be appreciated that different depth variation measures may be used, such as e.g., a depth variance, a maximum depth difference, a difference between different percentiles etc.

Figure 5:
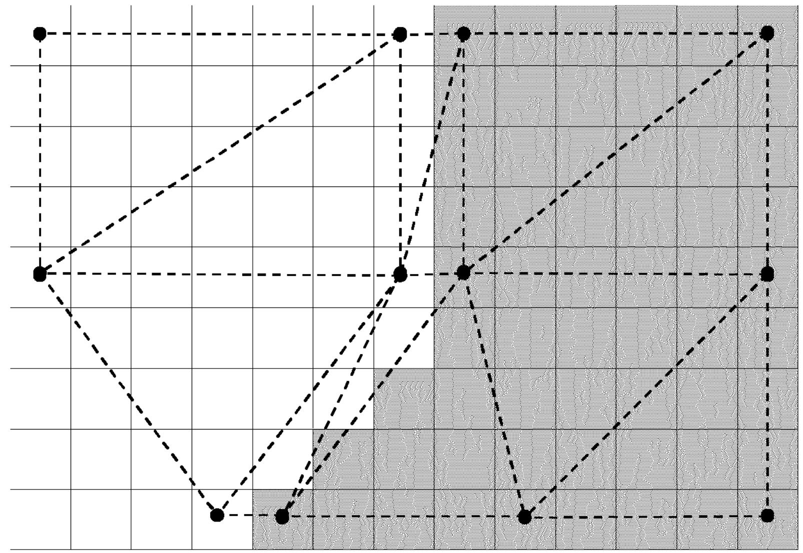
FIG. 5 illustrates an example of a depth map representation of a view of a scene.

FIG. 5 illustrates an example of how the reference positions for the example of FIG. 4 may be offset to produce primitives that more closely align with the depth variations and depth transitions in the image. In the example, two different depth levels are indicated by gray shading of the pixels. As can be seen, smaller primitives are generated around depth transitions and larger primitives are generated away from the depth transitions.

The position map generator 207 may in many embodiments be arranged to indicate the vertex positions in the input depth map as relative positions with respect to the reference vertex positions of the reference division. For example, the vertex position map may comprise offset indications that indicate the size and possibly the direction of the determined offset.

In many embodiments, the vertex positions in the input depth map are indicated by pixel positions and the offset may simply be given as an integer number of pixels or in some cases sub-pixels. Further, the maximum offset is often a relatively low number of pixels, and the vertex position map may accordingly be given as a map of relatively small integers. In many embodiments, a relatively large number of offsets may be zero (e.g. in larger relatively flat areas where the benefit of shifting vertex positions is very low). The vertex position map may in many embodiments be in the form of data which is highly suitable for efficient image or video compression as part of the encoding and inclusion in the output bitstream.

In some embodiments, the depth map generator 205 may be arranged to perform the offset in a predetermined direction. For example, the depth map generator 205 may be arranged to determine the offset in a horizontal direction or in a vertical direction. In some embodiments, the offset may be in the horizontal direction for the input depth map. In some embodiments, the offset may be in the vertical direction for the input depth map. For example, FIG. 5 is generated by introducing offsets to the regular grid of FIG. 4 only in the horizontal direction.

Limiting the offset to a predetermined direction results in the offset value simply being one dimensional and thus it may be represented in the vertex position map by a simple scalar value. Further, in particular, implementing an offset in the horizontal direction may reduce complexity substantially while achieving substantial advantages. Since humans typically move predominantly in a horizontal plane, spatial rendering benefits in particular in better depth step alignment in the horizontal direction.

In many embodiments where the offset is along a predetermined direction, the offset may be determined as an offset for which depth map value change for different offsets along the first predetermined direction meets a criterion. For example, the depth map generator 205 may for increasing offsets within a range determine a measure for the depth change of the current offset relative to the minimum offset. E.g., for increasing (or decreasing) offsets, the maximum depth step may be determined, e.g., as the difference between the maximum and minimum depth value for all offsets smaller than the current offset. The largest offset for which the depth step is below a threshold may then be selected. The range may be one that only includes negative offsets, positive offsets, or both negative and positive offsets.

Figure 6:
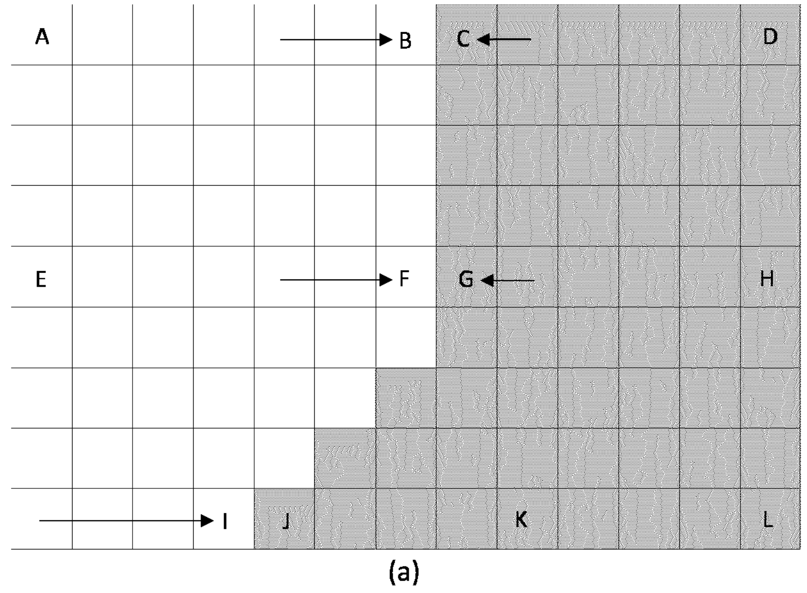
FIG. 6 illustrates an example of a depth map representation of a view of a scene.

FIG. 6 illustrates an example of how such an approach may result in the vertex positions of FIG. 5. In the example, vertex position A is the initial vertex position which is unchanged. New vertex position B is determined by offsetting the next reference vertex position in the horizontal direction by a horizontal offset. This horizontal offset is increased until a depth step above a given threshold is detected. The new vertex position is then determined as the last offset prior to the depth step. For the next horizontal position, the offset is increased in the opposite direction resulting in the new vertex position C being determined. D is at the last position of the row and is accordingly not offset. Corresponding approaches may be applied to the remaining vertex positions, and specifically to other rows of the reference pattern.

FIG. 6 also illustrates an example of a resulting decimated output depth map (b) which includes the depth values of the 12 vertex positions A-L determined in the 9×13 exemplary depth map (it will be appreciated that typical depth maps tend to be much larger and that the figures are merely intended as illustrative examples). Further, FIG. 6 illustrates an example of a corresponding vertex position map (c) which indicates the horizontal shift for each vertex position by a simple signed integer.

Thus, FIG. 6 illustrate the vertices from A to L with arrows showing how the vertices are moved horizontally from their original position. It shows how a lower resolution depth map is constructed by only storing the depth values at the deformed vertex position of the original high resolution depth map. A vertex position map/deformation map with the same resolution as the output depth map is generated which stores the deformation/offset that has been applied to the vertices of the rectangular shaped mesh. Since the resulting maps are 2D arrays they can be efficiently encoded, packed, and compressed using various video encoding algorithms.

As a specific example, the divisor 203 may be arranged to determine the offset vertex positions using an algorithm that shifts vertices horizontally based on an initial grid. For example, the following approach may be used (where Q indicates the grid distance between vertex points, i.e. Q=4 for a mesh with a 4×4 pixel grid, and D indicates the depth value of the input depth map):

1. For each vertex i search horizontally between $$x = x_i - \frac{Q}{2}, \cdots, x_i + \frac{Q}{2}$$

2. Determine the position $x_{step}$ that maximizes: $\Delta=\max(|D_x-D_x-1|, |D_x-D_{x+1}|)$ 3. If A exceeds a given threshold 4. Move the vertex position to $x_{step}$.

This approach seeks to shifts pixels horizontally until a new vertex position is found that borders a depth transition.

In some embodiments, the depth map generator 205 may further be arranged to determine an offset (component) in a different predetermined direction. Thus, in many embodiments, the offset may be determined in two different predetermined directions. The determinations may in many embodiments be sequential and/or independent. The depth map generator 205 may be arranged to first determine an offset (component) along the first predetermined direction, e.g., as previously described. Subsequently, and typically starting from the position offset in the first direction, a second offset (component) along the second predetermined direction is determined. This determination may for example use the same approach as for the first direction but with the offset now being along the second direction. The result may be considered as a single offset with two components or equivalently as two offsets in two respective directions.

The two predetermined directions may typically be the horizontal direction and the vertical direction. For example, an offset along the row direction may first be determined, followed by an offset along the column direction.

Figure 7:
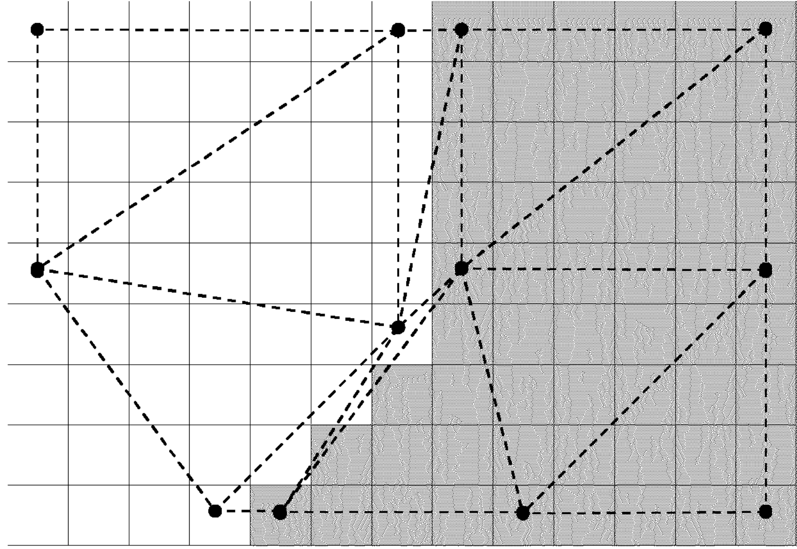
FIG. 7 illustrates an example of a depth map representation of a view of a scene.

An example, of applying the described approach in the horizontal direction is shown in FIG. 7. In the example, the depth map generator 205 has started with the regular reference grid of FIG. 4. Subsequently, an offset along the horizontal direction has been determined for the vertex points as previously described resulting in the modified vertex positions of FIG. 5. Subsequently, the same approach has been used to determine an offset along the vertical direction to the vertex points of FIG. 5. This has led to the vertex position pattern as shown in FIG. 7. As can be seen, an improved adaptation of the triangle primitives to the depth variation, and specifically the depth step, in the depth map has been achieved. The triangles around the depth step are small and align close to the depth transition. This is compensated by the triangles in the flatter areas being increased substantially in size. Indeed, the resulting mesh pattern covers the entire depth map using the same number of primitives and vertex points as the reference pattern/division. Thus, the average size of the primitives is unchanged by the deformation of the regular division/tessellation.

In many embodiments, the divisor 203 will be arranged to maintain the same number of primitives/vertex positions for the output depth map/vertex position map as for the reference division/vertex position pattern.

The position map generator 207 is arranged to generate information that reflects the two dimensional offsets. In some embodiments, a vertex position map may be generated which for each pixel includes the two offset components along the two predetermined directions.

Figure 8:
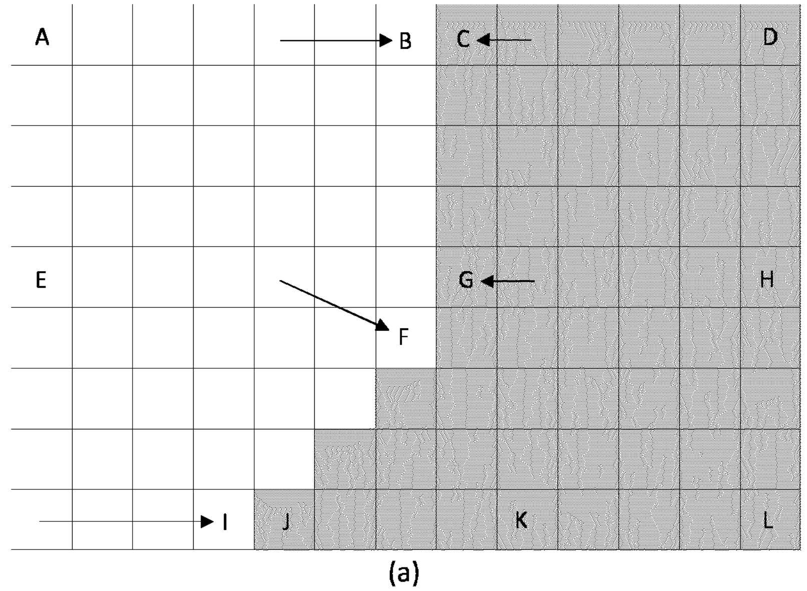
FIG. 8 illustrates an example of a depth map representation of a view of a scene.

However, in many embodiments, the position map generator 207 may be arranged to generate separate vertex position maps for the two predetermined directions. Thus, in addition to the vertex position map indicating the offsets in the first direction, e.g., in the horizontal direction, the position map generator 207 may further generate an additional vertex position map which indicates the offset in the second direction, e.g., in the vertical direction. Thus, rather than a single combined vertex position map, two separate vertex position maps may be generated. Each of these may comprise scalar values and typically the offset may be indicated as integers indicating a number of pixels being offset. FIG. 8 shows an example corresponding to FIG. 7 with the offsets being shown relative to the original reference pattern and with a first vertex position map (b) indicating offsets in the horizontal direction and a second vertex position map (c) indicating offsets in the vertical direction. As illustrated in the example, the vertex position maps may often comprise small integers and may in many scenarios include a large number of zero values.

The position map generator 207 may feed both vertex position maps to the bitstream generator 209 which is arranged to include both maps in the generated bit stream. A particular advantage of such an approach is that it allows a highly efficient encoding of the offset information. For example, each of the vertex position maps may be encoded using efficient video encoding algorithms or using other compression techniques optimized for efficient compression of small integer values (with e.g., a large number of identical values). Encoding two separate such two dimensional maps may be substantially more efficient than encoding of a combined vertex position map.

Thus, in many embodiments, the bitstream generator 209 may be arranged to encode the output depth map, and/or the vertex position map(s) using a video encoding algorithm. Indeed, the encoding may be based on a lossy video encoding technique. In more detail, for example, assuming the common YUV4:2:0 video frame format that is typically input to a video compression algorithm. The YUV4:2:0 video format has a full resolution luminance channel but two chrominance channels that are down-sample with a factor 4. In this case, the depth map could be placed in the Y-component and the horizontal and vertical displacement maps could be placed in the U and V component. The video encoder could now be configured at a quality level (quality=18) that corresponds to lossy compression but still a high quality. Due to lossy coding, there may be some permanent errors both in the depth map and in the displacement maps. However, this does likely not have a dramatic effect on rendering quality since it will only mean a small shift in one or more vertices. It should be noted that the video encoding exploits the spatial and temporal redundancy that is very likely to be present in both the decimated depth map and the displacement maps using block based spatial frequency transforms followed by quantization and motion prediction.

FIG. 3 illustrates elements of an exemplary apparatus for rendering a video bitstream of a video signal, and specifically from a video bitstream generated by the apparatus of FIG. 2.

The apparatus comprises a receiver 301 which is arranged to receive the video signal from the server of FIG. 2. Thus, the receiver 301 receives a video signal comprising a bitstream that includes, for one, more, and often all frames, a first depth map (the output depth map of the server), and a vertex position map indicative of vertex positions for depth values of the first depth map in a second depth map (the input depth map of the server) having a higher resolution than the first depth map. The vertex positions of the vertex position map define two dimensional geometric primitives forming a division of the second depth map.

The receiver is in the example coupled to a renderer 303 which is arranged to render video images from the received data. The renderer 303 is arranged to generate view images of the scene dependent on a viewer pose input thereby providing an immersive video experience.

The renderer 303 comprises a mesh generator 305 which is arranged to generate a 3D mesh representation of the scene based on the received information, and specifically based on the first depth map and the vertex position map.

The mesh generator 305 is arranged to generate the mesh to be formed by three dimensional geometric primitives formed by projection of the two dimensional geometric primitives of the second depth map to a 3D representation.

The mesh generator 305 may specifically be arranged to generate the mesh by first determining the vertex positions in a second map, i.e., in a map that has a higher spatial resolution that the received first depth map. This determination is based on the vertex position map.

As an example, the vertex position map may, as previously described, include vertex position information provided as position offsets relative to a reference pattern of vertex positions. The mesh generator 305 may determine the vertex positions corresponding to the depth values of the first depth map as the positions in the higher resolution map corresponding to the reference position being offset by a value indicated in the vertex position map.

For example, the mesh generator 305 may start with the defence positions indicated in FIG. 4 and then offset each position by an offset indicated by the vertex position map(s). Thus, in the example, where vertex position map(s) as shown in FIGS. 6(*c*) and 8(*b*)(*c*) are received, these values are applied to recreate the vertex positions determined at the encoder as indicated in FIGS. 6(*a*) and 8(*a*).

The mesh generator 305 is then arranged to project the vertex positions from the 2D position in the higher resolution depth map to a position in the 3D space of the mesh. The projection is given as a function of the 2D position and the depth map value for the vertex position. The projection of the 2D vertex positions to 3D space also corresponds to projection of the 2D primitives into 3D primitives and thus to a 3D mesh being generated.

It will be appreciated that the generation of a mesh from depth maps and (vertex) positions in the depth map is known to the skilled person and it will for brevity and clarity not be described further.

The renderer 303 further comprises a rendering unit which is arranged to generate the output images based on the generated mesh and the texture map. The rendering unit 307 may specifically receive a view pose for which view images of the scene are desired. The rendering unit 307 may then perform a warping of the mesh to a 2D view port/image for the viewer pose and then generate the image from the texture map.

The rendering unit 307 may for example implement a graphics pipeline including a vertex shader, geometry shader, pixel shader etc. as will be known to the skilled person. The renderer 303 may e.g. use a rendering implementation where the maps are sampled in the vertex shader of a graphics pipeline. First the (reference) vertex coordinates may be shifted according to the vertex position map in a vertex shader. The shifted coordinates may then be passed to the fragment shader and used to calculate the vertex 3D position (also output of the vertex shader pass).

The rendering unit 307 may use any suitable algorithm or approach for generating output images based on the mesh and it will be appreciated that many such approaches will be known to the skilled person.

In many embodiments, the reference pattern of vertex points, and thus the reference division or tessellation, is a predetermined fixed pattern that is known at both the transmitting/encoding/server end and at the receiving/decoding/client end. For example, the reference pattern may be a standardized pattern which can be applied at both ends.

In some embodiments, however, there may be more than one option for the reference pattern and the bitstream may include an indication of the reference pattern with reference to which the vertex position map is generated. For example, in some embodiments, the divisor 203 may select between a predetermined set of possible reference patterns and may include an indication of that pattern in the bitstream. E.g. identities may be assigned to each possible pattern (e.g. by a standard) and the bitstream may be generated to include an identity for the given pattern selected As another example, it may be predetermined that the reference pattern is a regular grid but the divisor 203 may dynamically select the size of the grid. For example, the bitstream may be generated to include a variable that indicates the distance (in pixels in the input depth map) between the reference vertex positions.

In such embodiments where the video bitstream is generated to include an indication of the selected reference division/pattern, the renderer 303 may be arranged to generate a local copy of the reference pattern based on this indication. For example, it may retrieve the pattern corresponding to the received identity or it may proceed to generate the positions of the pattern by applying a function or rule indicated in the bitstream (such as a distance between points in a regular grid).

In some embodiments, the reference pattern may be selected/indicated for the entire video signal, but in other embodiments it may be dynamically adapted and changed during the video signal. Indeed, in some embodiments, an indication of a reference pattern may be provided for each new vertex position map being transmitted/received.

Such an adaptive use of reference positions may provide improved performance in many embodiments. It may for example allow a better adaptation to the specific properties of the depth map and/or of the video signal. In some cases, the reference pattern may e.g., be selected based on the desired/required maximum bit rate or on a given quality level.

The described approach may provide improved operation in many scenarios and embodiments. It may allow an often substantial reduction in the depth map resolution for the depth map being included in the bitstream/video signal. The approach may allow a closer adaptation to the specific scene being represented and may provide improved information to the rendering side of the spatial properties. The adaptation of the primitives to the depth variations may allow improved characterization of the scene. It may often reduce and mitigate errors, artefacts, and inaccuracies. In particular, it may often reduce or mitigate errors, artefacts, and inaccuracies around depth transitions or steps.

The approach may provide improved computational efficiency. In many scenarios, the number of vertices that need to be considered and processed may be reduced substantially. The approach may for example in many scenarios enable real time processing and 3D adaptive video rendering in devices with relatively low computational resources.

The approach may for example allow improved immersive video where the presented/rendered view images are adapted according to the viewer pose, and specifically is adapted to reflect user head movements.

The approach may often allow an improved user experience, and for example may often allow a more realistic 3D perception by a user.

It will be appreciated that whereas the previous description focusses on the generated bitstream including a texture map and the rendering being based on this texture map, this is not essential or necessary for the operation, and in particular is not necessary for the communication of information relating to the mesh or for the creation of this at the client side. For example, in other embodiments, the mesh may be generated without consideration of texture maps. For example, in some embodiments, the client application can assign material properties to the mesh, introduce a light source in the scene and render a shaded mesh.

The invention can be implemented in any suitable form including hardware, software, firmware, or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

In accordance with standard terminology in the field, the term pixel may be used to refer to a property associated with the pixel, such as a light intensity, depth, position of a part/element of the scene represented by the pixel. For example, a depth of a pixel, or a pixel depth, may be understood to refer to the depth of the object represented by that pixel. Similarly, a brightness of a pixel, or a pixel brightness, may be understood to refer to the brightness of the object represented by that pixel. Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality. Reference signs in the claims are provided merely as a clarifying example shall not be construed as limiting the scope of the claims in any way.

The invention claimed is:

1. An apparatus comprising:

a receiver circuit, wherein the receiver circuit is arranged to receive a first depth map, wherein the first depth map is for at least a first video frame of a plurality of videos frames;

a divider circuit, wherein the divider circuit is arranged to divide at least a portion of the first depth map into a plurality of two dimensional geometric primitives, wherein each of the plurality of two dimensional geometric primitives have an average area, wherein the average area exceeds twice a pixel area for the first depth map, wherein the divider circuit is arranged to determine vertex positions in the first depth map, wherein vertex position are for vertices of the plurality of two dimensional geometric primitives, wherein the divider circuit is arranged to generate the vertex positions based on the depth values of the first depth map, a map generator circuit, wherein the map generator circuit is arranged to generate a vertex position map, wherein the vertex position map indicates the vertex positions in the first depth map;

a depth map generator circuit, wherein the depth map generator circuit is arranged to generate a second depth map, wherein the second depth map comprises the depth values of the first depth map at the vertex positions in the first depth map;

a bitstream generator circuit, wherein the bitstream generator circuit is arranged to generate a video bitstream, wherein the video bitstream comprises the first video frame, the second depth map and the vertex position map.

2. The apparatus of claim 1, wherein the divider circuit is arranged to determine the vertex positions by offsetting reference vertex positions of a reference division of the first depth map, wherein the offsetting for a first vertex point is based on values of the depth map for pixels within a geometric primitive of the first vertex point.

3. The apparatus of claim 2, wherein the reference vertex positions of the reference division form a regular grid.

4. The apparatus of claim 2, wherein the vertex position map indicates the vertex positions as relative positions with respect to the reference vertex positions of the reference division.

5. The apparatus of claim 2, wherein the offsetting comprises a first offset along a first predetermined direction, wherein the first offset is determined as an offset for which a change of depth map values along the first predetermined direction meets a criterion.

6. The apparatus of claim 2, wherein the offsetting comprises a second offset along a second predetermined direction, wherein the second offset is determined as an offset for which a change of depth map values along the second predetermined direction meets a criterion, wherein the map generator circuit is arranged to generate the vertex position map so as to indicate offsets along the first predetermined direction, wherein the map generator circuit is arranged to generate an additional vertex position map so as to indicate offsets along the second predetermined direction;

wherein the bitstream generator circuit is arranged to provide the additional vertex position map in the video bitstream.

7. The apparatus of claim 2, where the first predetermined direction is a horizonal direction.

8. The apparatus of claim 2, where the first predetermined direction is a vertical direction.

9. The apparatus of claim 2, wherein the offsetting is below an offset threshold.

10. The apparatus of claim 1, wherein the bitstream generator circuit comprises a video encoder, wherein the video encoder is arranged to encode the vertex position map using video encoding.

11. The apparatus of claim 1, wherein the divider circuit is arranged to determine the vertex positions so as to align the plurality of two dimensional geometric primitives with depth transitions in the depth map.

12. An apparatus comprising:

a receiver circuit, wherein the receiver circuit is arranged to receive a video bitstream, wherein the video bitstream comprises:

a first depth map for at least a first frame; and a vertex position map for at least a first frame, wherein the vertex position map indicates vertex positions for depth values of the first depth map in a second map, wherein the second map has a higher resolution than the first depth map, wherein the vertex positions define a plurality two dimensional geometric primitives, wherein the plurality of two dimensional geometric primitives form a division of the second map; and a renderer circuit, the renderer circuit comprising:

a mesh generator circuit, wherein the mesh generator circuit is arranged to generate a mesh representation of a scene, wherein the mesh is formed by three dimensional geometric primitives, wherein the three dimensional geometric primitives are formed by a projection of the plurality of two dimensional geometric primitives into a three dimensional space, wherein the projection of a first vertex of the plurality of two dimensional geometric primitives depend on a vertex position of the first vertex in the second depth map and a depth value in the first depth map for the first vertex; and a rendering circuit, wherein the rendering circuit is arranged to render an image based on the mesh representation.

13. The apparatus of claim 12, wherein the vertex position map indicates the vertex positions as relative vertex positions with respect to reference vertex positions of a reference division of the first depth map, wherein the mesh generator circuit is arranged to determine absolute vertex positions in the second depth map based on the relative vertex positions and the reference vertex positions.

14. The apparatus of claim 13, wherein the video bitstream comprises an indication of the reference division, wherein the mesh generator circuit is arranged to determine the reference vertex positions in response to the indication of the reference division.

15. A method comprising:

receiving a first depth map, wherein the first depth map is for at least a first video frame of a plurality of videos frames;

dividing at least a portion of the first depth map into a plurality two dimensional geometric primitives, wherein each of the plurality of two dimensional geometric primitives having an average area, wherein the average area exceeds twice a pixel area for the first depth map, wherein the divider circuit is arranged to determine vertex positions in the first depth map, wherein vertex position are for vertices of the plurality of two dimensional geometric primitives, wherein generating the vertex positions is bases on the depth values of the depth map;

generating a vertex position map, wherein the vertex position map indicates indicative of the vertex positions in the first depth map;

generating a second depth map, wherein the second depth map comprises the depth values of the first depth map at the vertex positions in the first depth map; and generating a video bitstream wherein the video bitstream comprises the first video frame, the second depth map and the vertex position map.

16. A computer program on a non-transitory medium, wherein the computer program when executed on a processor performs the method as claimed in claim 15.

17. The method of claim 15, further comprising determining the vertex positions by offsetting reference vertex positions of a reference division of the first depth map, wherein the offsetting for a first vertex point is based on values of the depth map for pixels within a geometric primitive of the first vertex point.

18. The method of claim 17, wherein the reference vertex positions of the reference division form a regular grid.

19. The method of claim 17, wherein the vertex position map indicates the vertex positions as relative positions with respect to the reference vertex positions of the reference division.

20. The method of claim 17, wherein the offsetting comprises a first offset along a first predetermined direction, wherein the first offset is determined as an offset for which a change of depth map values along the first predetermined direction meets a criterion.

21. The method of claim 17, wherein the offsetting comprises a second offset along a second predetermined direction, wherein the second offset is determined as an offset for which a change of depth map values along the second predetermined direction meets a criterion, wherein the map generator circuit is arranged to generate the vertex position map so as to indicate offsets along the first predetermined direction, wherein the map generator circuit is arranged to generate an additional vertex position map so as to indicate offsets along the second predetermined direction;

wherein the bitstream generator circuit is arranged to provide the additional vertex position map in the video bitstream.

22. The method of claim 15, further comprising determining the vertex positions so as to align the plurality of two dimensional geometric primitives with depth transitions in the depth map.

23. A method comprising:

receiving a video bitstream, wherein the video bitstream comprises:

a first depth map for at least a first frame; and a vertex position map for at least a first frame, wherein the vertex position map indicates vertex positions for depth values of the first depth map in a second map, wherein the second map has a higher resolution than the first depth map, wherein the vertex positions define a plurality two dimensional geometric primitives, wherein the plurality of two dimensional geometric primitives form a division of the second map; and rendering video images from the video bitstream, the rendering comprising:

generating a mesh representation of a scene, wherein the mesh is formed by three dimensional geometric primitives, wherein the three dimensional geometric primitives are formed by a projection of the plurality of two dimensional geometric primitives to a three dimensional space, wherein the projection of a first vertex of the plurality of two dimensional geometric primitives depend on a vertex position of the first vertex in the second depth map and a depth value in the first depth map for the first vertex; and rendering an image based on the mesh representation.

24. A computer program stored on a non-transitory medium, wherein the computer program when executed on a processor performs the method as claimed in claim 23.

25. The apparatus of claim 23, wherein the vertex position map indicates the vertex positions as relative vertex positions with respect to reference vertex positions of a reference division of the first depth map, wherein the mesh generator circuit is arranged to determine absolute vertex positions in the second depth map based on the relative vertex positions and the reference vertex positions.

26. The apparatus of claim 25, wherein the video bitstream comprises an indication of the reference division, wherein the mesh generator circuit is arranged to determine the reference vertex positions in response to the indication of the reference division.

* * * * *